(12) United States Patent
Sheu et al.

(10) Patent No.: US 10,110,357 B2
(45) Date of Patent: Oct. 23, 2018

(54) COOPERATIVE COMMUNICATION METHOD AND SYSTEM

(71) Applicant: INDUSTRIAL TECHNOLOGY RESEARCH INSTITUTE, Hsinchu (TW)

(72) Inventors: Chorng-Ren Sheu, Hsinchu (TW); Yao-Win Peter Hong, Hsinchu (TW); Yung-Shun Wang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 42 days.

(21) Appl. No.: 15/447,364

(22) Filed: Mar. 2, 2017

(65) Prior Publication Data
US 2018/0123753 A1    May 3, 2018

Related U.S. Application Data

(60) Provisional application No. 62/416,765, filed on Nov. 3, 2016.

(30) Foreign Application Priority Data

Dec. 13, 2016 (TW) .............................. 105141205 A (51) Int. Cl.
*H04L 5/00* (2006.01)
*H04B 7/0456* (2017.01)
(Continued)

(52) U.S. Cl.
CPC ......... *H04L 5/0035* (2013.01); *H04B 7/0456* (2013.01); *H04L 5/0073* (2013.01);
(Continued)

(58) Field of Classification Search
CPC ..... H04L 5/0035; H04L 47/50; H04L 5/0073; H04B 7/0456; H04W 72/005; H04W 72/1215
See application file for complete search history.

(56) References Cited

U.S. PATENT DOCUMENTS

| 7,418,053 B2 | 8/2008 | Perlman et al. |
| 7,606,182 B2 | 10/2009 | Park et al. |

(Continued)

FOREIGN PATENT DOCUMENTS

| CN | 102801505 | 11/2012 |
| TW | 201424290 | 6/2014 |

OTHER PUBLICATIONS

Khandaker et al. "Precoding Design for MIMO Relay Multicasting" IEEE Transactions on Wireless Communications, vol. 12, No. 7 pp. 3544-3555, Jul. 2013 (Year: 2013).*

(Continued)

*Primary Examiner* — Wutchung Chu
(74) *Attorney, Agent, or Firm* — Amin, Turocy & Watson LLP (57) ABSTRACT

A cooperative communication method and a cooperative communication system are provided for the transmission between multiple transmission devices and their corresponding receiving devices. In a first phase of a communication period, at least one of the multiple transmission devices performs a first phase precoding on data using a multicasting precoding matrix so as to transmit the data precoded by the first phase precoding to other transmission devices. In a second phase of the communication period, the multiple transmission devices performs a second phase precoding on data received in the first phase using a joint precoding matrix so as to transmit the data precoded by the second phase (Continued)

precoding to the multiple receiving devices corresponding to the multiple transmission devices.

20 Claims, 5 Drawing Sheets (51) Int. Cl.
*H04W 72/00* (2009.01)
*H04L 12/863* (2013.01)
*H04W 72/12* (2009.01)

(52) U.S. Cl.
CPC .......... *H04L 47/50* (2013.01); *H04W 72/005* (2013.01); *H04W 72/1215* (2013.01)

(56) References Cited

U.S. PATENT DOCUMENTS

| | | | | |
|---|---|---|---|---|
| 8,462,658 | B2* | 6/2013 | Long | H04B 7/024 370/252 |
| 8,660,601 | B2* | 2/2014 | Seo | H04B 7/024 455/127.1 |
| 8,976,888 | B2 | 3/2015 | Zheng | |
| 8,995,311 | B2 | 3/2015 | Wolfgang | |
| 8,995,313 | B2 | 3/2015 | Yang et al. | |
| 9,112,548 | B2 | 8/2015 | Garcia Armada et al. | |
| 9,374,199 | B2* | 6/2016 | Schulz | H04L 1/1819 |
| 9,407,344 | B2* | 8/2016 | Ryu | H04B 7/024 |
| 9,414,390 | B2 | 8/2016 | Kim | |
| 2008/0192849 | A1* | 8/2008 | Kim | H04L 1/06 375/260 |
| 2009/0147728 | A1 | 6/2009 | Atia et al. | |
| 2011/0110403 | A1* | 5/2011 | Jongren | H04L 25/03343 375/219 |
| 2012/0106388 | A1* | 5/2012 | Shimezawa | H04B 7/024 370/252 |
| 2013/0250885 | A1 | 9/2013 | Davydov et al. | |

OTHER PUBLICATIONS

Rajan, et al. "A Non-Orthogonal Cooperative Multiple Access (NCMA) Protocol and Low ML Decoding Complexity Codes", IEEE Wireless Communications and Networking Conference, Mar. 2007, pp. 885-890.

Haija, et al. "Spectral Efficiency and Outage Performance for Hybrid D2D-Infrastructure Uplink Cooperation", IEEE Transactions on Wireless Communication, Mar. 2015, pp. 1183-1198.
Wei, et al. "Multi-pair device-to-device communications with space-time analog network coding", IEEE Wireless Communications and Networking Conference (WCNC), Mar. 2015, pp. 920-925.
Chen, et al. "On Transceiver Beamformer Design for Multi-Source Multi-Destination Wireless Networks", Global Telecommunications Conference (GLOBECOM 2011), Dec. 2011, pp. 920-925.
Zhang, et al. "High-Throughput Non-Orthogonal Interleaved Random Space-Time Coding for Multi-Source Cooperation", IEEE GLOBECOM 2008. Global Telecommunications Conference, Dec. 2008, pp. 1-5.
Ribeiro, et al. "Multi-Source Cooperation with Full-Diversity Spectral-Efficiency and Controllable-Complexity", IEEE Journal on Selected Areas in Communications, Feb. 2007, pp. 415-425.
Asadi, et al. "A Survey on Device-to-Device Communication in Cellular Networks", IEEE Communications Surveys & Tutorials, vol. 16, No. 4, pp. 1801-1819, Fourthquarter 2014.
Doppler, et al. "Device-to-Device Communication as an Underlay to LTE-Advanced Networks", IEEE Commun. Mag., vol. 47, No. 12, pp. 42-49, 2009.
Cao, et al. "Cooperative device-to-device communications in cellular networks", IEEE Wireless Communications, vol. 22, No. 3, pp. 124-129, Jun. 2015.
Seyedmehdi, et al. "An Efficient Clustering Algorithm for Device-to-Device Assisted Virtual MIMO", IEEE Trans. Wireless Commun., vol. 13, No. 3, pp. 1334-1343, Mar. 2014.
Zhang, et al. "Cooperative Multi-Cell Block Diagonalization with Per-Base-Station Power Constraints", IEEE J. Sel. Areas Commun., vol. 28, No. 9, pp. 1435-1445, 2010.
Ramezani-Kebrya, et al. "Per-Relay Power Minimization for Multi-user Multi-channel Cooperative Relay Beamforming", IEEE Trans. Wireless Commun., vol. 15, No. 5, pp. 3187-3198, May 2016.
Gesbert, et al. "Multi-cell MIMO cooperative networks: a new look at interference", IEEE J. Sel. Areas Commun., vol. 28, No. 9, pp. 1380-1408, 2010.
Neely, et al. "Energy optimal control for time-varying wireless networks", IEEE Trans. Inf. Theory, vol. 52, No. 7, pp. 2915-2934, 2006.
Georgiadis, et al. "Resource allocation and cross-layer control in wireless networks", Foundations Trends Networking, vol. vol. 1, No. 1, pp. 1-149, 2006.
Shirani-Mehr, et al. "MIMO Downlink Scheduling with Non-Perfect Channel State Knowledge", IEEE Trans. Commun., vol. 58, No. 7, pp. 2055-2066, Jul. 2010.

* cited by examiner

COOPERATIVE COMMUNICATION METHOD AND SYSTEM

CROSS-REFERENCE TO RELATED APPLICATION

The application is based on, and claims benefit from U.S. Provisional Application Ser. No. 62/416,765, filed on Nov. 3, 2016 and Taiwan Application No. 105141205, filed on Dec. 13, 2016, of which the disclosure are hereby incorporated by reference herein in their entirety.

BACKGROUND

1. Technical Field

The present disclosure relates to a cooperative communication method and system, and more particularly, to a cooperative communication method and system applicable to multiple transmission devices and multiple receiving devices.

2. Description of Related Art

Device-to-device (D2D) communication is a technology that allows devices to communicate directly with each other without relaying through a base station, improving the data transmission rate between devices and the spectrum utilization of the system. As the number of user devices increases and the amount of data in D2D communications increases, the system will need to accommodate a large number of D2D devices performing simultaneous transmission. This means that interference between D2D devices has to be taken into consideration. How to improve communication quality in D2D communication technology in the presence of the aforementioned factor is a key issue faced in the industry.

In relay transmission technology, data sources can first transfer their information to a designated relay. The designated relay can then transfer the information to target locations. As the relay is only responsible for data transfer between data sources and destinations without transmitting its own information, there is no need to allocate resources between the data source and the relay. In contrast, when each of the transmitters in the D2D communication system serves as a relay for other transmitters, each of the transmitters, in addition to transmitting its own data, will assist in the relay of data from other transmitters. In this case, each transmitter needs to allocate resources between transmitting its own information and transmitting the information of other transmitter, and it is also necessary to ensure that the transmission efficiency is improved for each transmitter under such mutual relay transmission.

SUMMARY

In an embodiment, a method for cooperative communication of the present disclosure may include: performing in a first phase, by at least one of a plurality of transmission devices, a first phase precoding on data using a multicasting precoding matrix; transmitting in the first phase, by the at least one of the plurality of transmission devices, the data precoded by the first phase precoding to transmission devices other than the at least one of the plurality of transmission devices; performing in a second phase, by the plurality of transmission devices, a second phase precoding on data received in the first phase using a joint precoding matrix; and transmitting in the second phase, by the plurality of transmission devices, the data precoded by the second phase precoding to a plurality of receiving devices corresponding to the plurality of transmission devices, wherein the transmission devices use respective multicasting precoding matrixes and respective joint precoding matrixes, wherein the multicasting precoding matrix and the joint precoding matrix are calculated based on an estimated transmission rate or an estimated transmission power of the plurality of transmission devices in the first phase and the second phase.

In another embodiment, a system for cooperative communication of the present disclosure may include: a plurality of transmission devices, each including a signal transceiver and a processor; and a plurality of receiving devices corresponding to the plurality of transmission devices, and each including a signal transceiver and a processor, wherein in a first phase, the processor of at least one of the plurality of transmission devices is configured to perform a first phase precoding on data using a multicasting precoding matrix, and the signal transceiver of the at least one of the plurality of transmission devices is configured to transmit the data precoded by the first phase precoding to transmission devices other than the at least one of the plurality of transmission devices; and in a second phase, the processors of the plurality of transmission devices are configured to perform a second phase precoding on data received in the first phase using a joint precoding matrix, and the signal transceivers of the plurality of transmission devices are configured to transmit the data precoded by the second phase precoding to the plurality of receiving devices corresponding to the plurality of transmission devices, and wherein the transmission devices use respective multicasting precoding matrixes and respective joint precoding matrixes, and wherein the processors of the plurality of transmission devices are configured to calculate the multicasting precoding matrix and the joint precoding matrix based on an estimated transmission rate or an estimated transmission power of the plurality of transmission devices in the first phase and the second phase.

DETAILED DESCRIPTION

The present disclosure is described by the following specific embodiments. Those with ordinary skills in the arts can readily understand other advantages and functions of the present disclosure after reading the disclosure of this specification. It should be noted that the structures, ratios, sizes shown in the drawings appended to this specification are to be construed in covariance with the disclosure of this specification in order to facilitate understanding of those skilled in the art. They are not meant, in any ways, to limit the implementations of the present disclosure. Any modifications to the structures, changes to the ratios and adjustments to the sizes without affecting the effects and objectives achieved by the present disclosure should fall within the scope of the technical contents disclosed in the present disclosure.

Figure 1A:
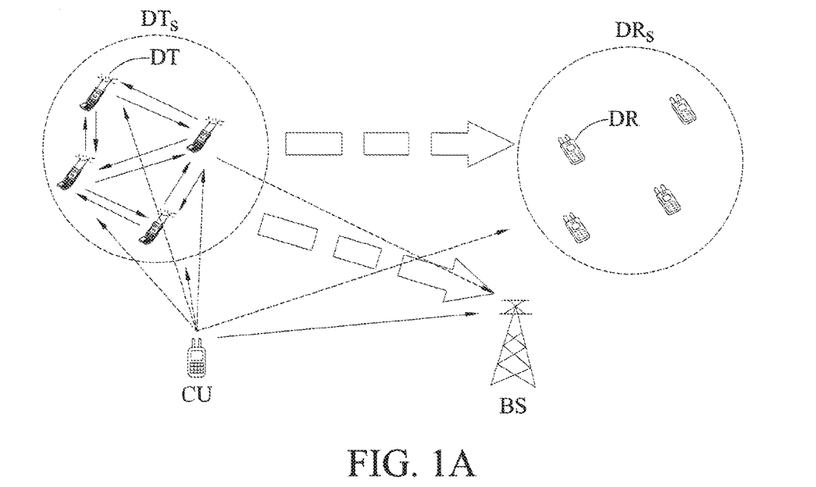
FIG. 1A is a schematic diagram illustrating a cooperative communication system in accordance with the present disclosure.

Referring to FIG. 1A, a cooperative communication system of the present disclosure includes K cooperative D2D pairs, that is, the cooperative communication system of the present disclosure includes K transmission devices DTs and K receiving devices DRs being in communication therewith. Each transmission device DT corresponds to one receiving device DR and has its own data to be transmitted. In addition, each transmission device DT has $N_t$ antennas and each receiving device DR has $N_r$ antennas. The cooperative communication system of the present disclosure may further include a base station BS and a cellular user CU. The cellular user CU may be a multi-antenna cellular user transmitting in the uplink to the base station BS. In this embodiment, K transmission devices and K receiving devices are aware of the interference received from the cellular user CU and the statistical characteristic of interference on the base station (for example, the interference that may cause at the base station BS).

Figure 1B:
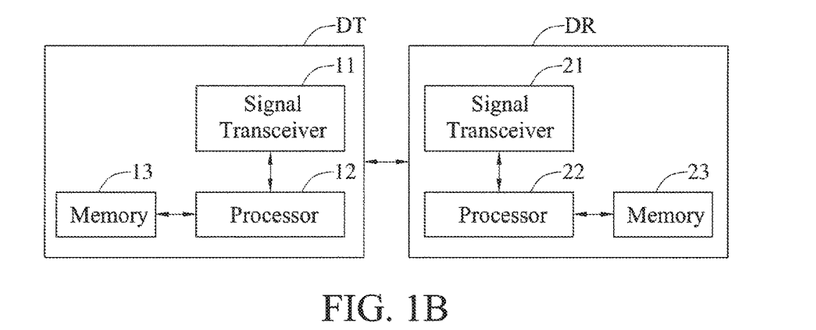
FIG. 1B is a schematic diagram illustrating transmission devices and receiving devices in accordance with the present disclosure.

Referring to FIG. 1B, each transmission device DT includes a signal transceiver 11, a processor 12 and a memory 13 connected with the processor 12. Each receiving device DR includes a signal transceiver 21, a processor 22 and a memory 23 connected with the processor 22. In a first phase of a communication period, the processor 12 of at least one of the transmission devices DTs is configured to perform a first phase precoding by turns on data using a multicasting precoding matrix, and the signal transceiver 11 of the at last one of the transmission devices DTs is configured to transmit the data precoded by the first phase precoding to all other transmission devices DTs. In a second phase of the communication period, the processors 12 of the transmission devices DTs are configured to perform a second phase precoding on data received in the first phase using a joint precoding matrix, and the signal transceivers 11 of the transmission devices DTs are configured to transmit the data precoded by the second phase precoding to the signal transceivers 21 of the receiving devices DRs corresponding to the transmission devices DTs. Moreover, the transmission devices DTs use respective multicasting precoding matrixes and respective joint precoding matrixes. The processors 12 of the transmission devices DTs are configured to calculate the multicasting precoding matrix and the joint precoding matrix based on an estimated transmission rate or an estimated transmission power in the first and the second phases of the transmission devices DTs and receiving devices DRs. In addition, the processors 12 of the plurality of transmission devices DTs are configured to allocate the power consumption of the first phase and the second phase in balance, and the processors 12 of the plurality of transmission devices DTs are configured to allocate the transmission rate of the first phase and the second phase in balance. These are described in more details later.

Figure 2:
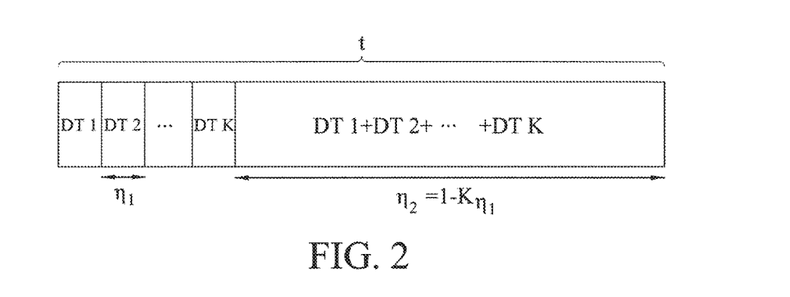
FIG. 2 is a schematic diagram illustrating the cooperative communication system and method of the present disclosure divided into two-phase transmission.

Referring to FIG. 2, the communication period t can be divided into a data-sharing transmission phase (refers to the first phase) and a cooperative joint transmission phase (refers to the second phase). In the first phase, K transmission devices DTs take turns in transmitting its own data to other transmission devices; in the second phase, K transmission devices DTs jointly transmit their data to all corresponding receiving devices DRs. As shown in FIG. 2, $\eta_1$ portion of the communication period t is allocated to each transmission device DT in the first phase and $\eta_2 \triangleq 1-K\eta_1$ is allocated to the entire second phase.

Figure 3:
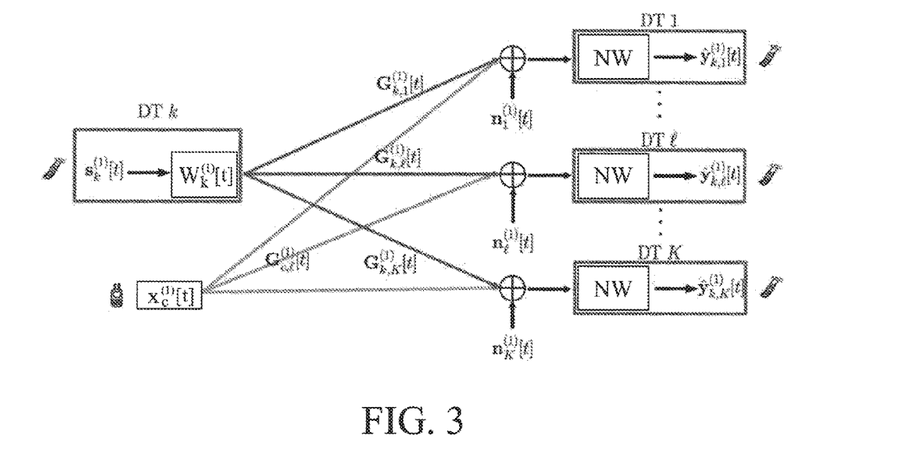
FIG. 3 is a schematic diagram illustrating the cooperative communication system and method of the present disclosure performing a first phase precoding.

Referring to FIG. 3, $s_k^{(1)}[t] \in \mathbb{C}^{N_t \times 1}$ is the data signal to be transmitted by the transmission device DT k in the first phase of the communication period t. During the transmission by the transmission device DT k in the first phase, the data signal $s_k^{(1)}[t]$ is multicast to all other transmission devices using a multicasting precoding matrix $W_k^{(1)}[t] \in \mathbb{C}^{N_t \times N_t}$. The received signal at a transmission device DT l is:

$$\hat{y}_{k,l}^{(1)}[t] = \Upsilon_l^{(1)}[t](G_{k,l}[t]W_k^{(1)}[t]s_k^{(1)}[t] + G_{c,l}[t]x_c^{(1)}[t] + n_l^{(1)}[t]),$$

wherein $G_{k,l}[t]$ is the channel from the transmission device DT k to the transmission device DT l, and $\Upsilon_l^{(1)}[t]$ is a Noise Whitening (NW) matrix. The achievable multicast rate for the transmission device DT k (which can be regarded as an estimated transmission rate during the first phase) is:

$$R_k^{(1)}[t] \triangleq \min_{l \neq k} \eta_1 \log_2|I_{N_t} + \Upsilon_l^{(1)}[t]G_{k,l}[t]Q_k^{(1)}[t](\Upsilon_l^{(1)}[t]G_{k,l}[t])^H|,$$

wherein $Q_k^{(1)}[t] = W_k^{(1)}[t]W_k^{(1)}[t]^H$ is a covariance matrix.

Figure 4:
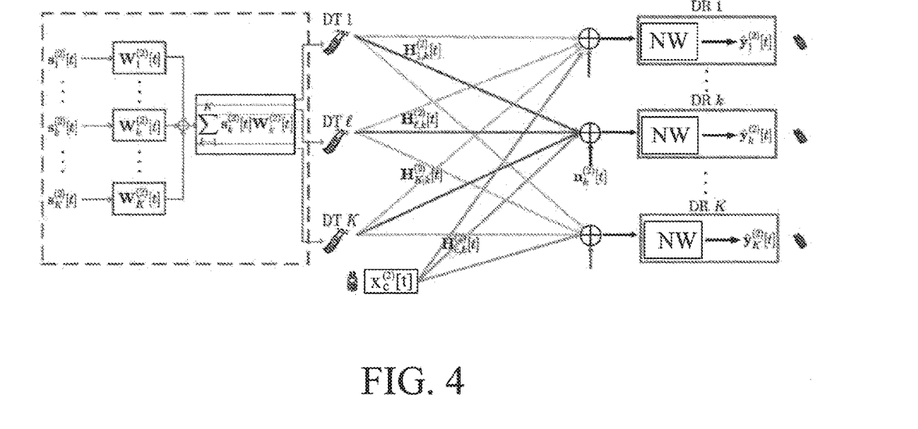
FIG. 4 is a schematic diagram illustrating the cooperative communication system and method of the present disclosure performing a second phase precoding.

Referring to FIG. 4, in the second phase of the communication period t, the K transmission devices DTs jointly transmit data to the corresponding K receiving devices DRs using a joint precoding matrix. The received signal of a receiving device DR k in the second phase is:

$$\hat{y}_k^{(2)}[t] = \Upsilon_k^{(2)}[t](H_k[t]W_k^{(2)}[t]s_k^{(2)}[t] + H_k[t]\Sigma_{l \neq k} W_l^{(2)}[t]s_l^{(2)}[t] + H_{c,k}[t]x_c^{(2)}[t] + n_k^{(2)}[t]).$$

wherein $s_k^{(2)}[t]$ is data signal for a receiving device DR k transmitted in the second phase, and $W_k^{(2)}[t]$ is a joint precoding matrix for $s_k^{(2)}[t]$.

With an example of using block diagonalization (BD) precoding, the BD precoder must satisfy the following equation:

$$Q_k^{(2)}[t] = W_k^{(2)}[t]W_k^{(2)}[t]^H = \tilde{V}_k[t]\tilde{Q}_k^{(2)}[t]\tilde{V}_k[t]^H,$$

wherein $\tilde{V}_k[t]$ forms the null space of interference channels. With BD precoding, the inter-user interference at the receiving devices DR can be eliminated. The achievable rate at the receiving device DR k (which can be regarded as an estimated transmission rate during the second phase) is:

$$R_k^{(2)}[t] \triangleq \eta_2 \log_2|I_{N_r} + \tilde{H}_k[t]\tilde{Q}_k^{(2)}[t]\tilde{H}_k^H[t]|,$$

wherein $\tilde{H}_k[t] \triangleq \Upsilon_k^{(2)}[t]H_k[t]\tilde{V}_k[t]$ is an effective channel of the receiving device DR k. Then, with the first and second phases, the overall rate of the k-th D2D pair is:

$$R_k[t] = \min(R_k^{(1)}[t], R_k^{(2)}[t]).$$

The overall rate of the k-th D2D pair can be regarded as the estimated transmission rate for the transmission device DT k and the receiving device DR k in the communication period under the above cooperative communication method.

In addition, the total power consumption of transmission device DT k is:

$$P_k[t] = \eta_1 tr\{Q_k^{(1)}[t]\} + \eta_2 \Sigma_{l=1}^{K} tr\{\Theta_k Q_l^{(2)}[t]\}, \quad 5$$

wherein $\Theta_k$ is a block-diagonal matrix with k-th block is $N_t \times N_t$ identity matrix and the other elements are zero. The total power consumption of transmission device DT k can be regarded as the estimated transmission power for the transmission device DT k in the communication period under the above cooperative communication method.

In addition, the long-term sum utility maximization of multiple D2D pairs is considered. The long-term sum utility is defined as:

$$\sum_{k=1}^{K} g\left(\lim_{T\to\infty} \frac{1}{T}\sum_{t=1}^{T} R_k[t]\right),$$

where g(•) is utility function which can be sum of average rate or proportional fairness of D2D pairs.

The long-term power constraints, cooperative rate-gain constraints, and interference constraints are considered for the multicasting and joint precoding matrix.

The long-term power constraint is used to consider the long-term average power consumption of the transmission devices DTs, which is represented as:

$$\lim_{T\to\infty} \frac{1}{T}\sum_{t=1}^{T} P_k[t] \le \overline{P}_k, \forall k,$$

where $\overline{P}_k$ is the power constraint (that can be regarded as a power consumption threshold).

The cooperative rate-gain constraint is that the long-term average transmission rate can be improved with the cooperation of the transmission devices DTs. The constraint is written as:

$$\lim_{T\to\infty} \frac{1}{T}\sum_{t=1}^{T} R_k[t] \ge \lim_{T\to\infty} \frac{1}{T}\sum_{t=1}^{T} R_k^{(NC)}[t], \forall k,$$

where $R_k^{(NC)}[t]$ is the achievable rate of k-th pair in each communication period, and $$\lim_{t\to\infty} \frac{1}{T}\sum_{t=1}^{T} R_k^{(NC)}[t]$$

can be regarded as a long-term average transmission rate without cooperative communication.

The interference toward the base station BS is considered in each communication period, which is presented as the interference constraint:

$$\eta_1 tr(C_{G,k}[t]Q_k^{(1)}[t]) + \eta_2 tr(C_{G,b}[t]Q_k^{(2)}[t]) \le IT_k, \forall k, \forall t,$$

where $C_{G,k}[t] = G_{k,b}^H[t]G_{k,b}[t]$, and $C_{G,b}[t] = G_b^H[t]G_b[t]$. $G_{k,b}[t] \in \mathbb{C}^{N_b \times N_t}$ is the channel between the transmission device DT k and the base station BS and $G_b[t] = [G_{1,b}[t], \ldots, G_{K,b}[t]]$. With the above constraints, the long-term precoder design problem is formulated as:

$$\max_{Q_k^{(1)}[t], Q_k^{(2)}[t], \forall k, t} \sum_{k=1}^{K} g\left(\lim_{T\to\infty} \frac{1}{T}\sum_{t=1}^{T} R_k[t]\right)$$

$$\text{subject to } \lim_{T\to\infty} \frac{1}{T}\sum_{t=1}^{T} P_k[t] \le \overline{P}_k, \forall k,$$

$$\lim_{T\to\infty} \frac{1}{T}\sum_{t=1}^{T} R_k[t] \ge \lim_{T\to\infty} \frac{1}{T}\sum_{t=1}^{T} R_k^{(NC)}[t], \forall k,$$

$$\eta_1 tr(C_{G,k}[t]Q_k^{(1)}[t]) + \eta_2 tr(C_{G,b}[t]Q_k^{(2)}[t]) \le IT_k, \forall k, \forall t,$$

$$Q_k^{(1)}[t] \succeq 0, Q_k^{(2)}[t] \succeq 0, \forall k, \forall t.$$

It should be noted that the long-term power constraint is based on a condition that the long-term average power consumption of the transmission devices DTs is constrained to be less than or equal to a power consumption threshold $\overline{P}_k$. The cooperative rate-gain constraint is based on a condition that the long-term average transmission rate is constrained to be greater than or equal to a long-term average transmission rate without cooperative communication $$\lim_{t\to\infty} \frac{1}{T}\sum_{t=1}^{T} R_k^{(NC)}[t].$$

The interference constraint is based on a condition that the interference on a receiving signal of a base station is constrained to be less than or equal to an interference threshold.

From the above, it is clear that all of the formulae above take the first and second phases into account. In other words, the multicasting precoding matrix and the joint precoding matrix in the present disclosure are jointly designed based on both the first phase and the second phase.

Figure 5:
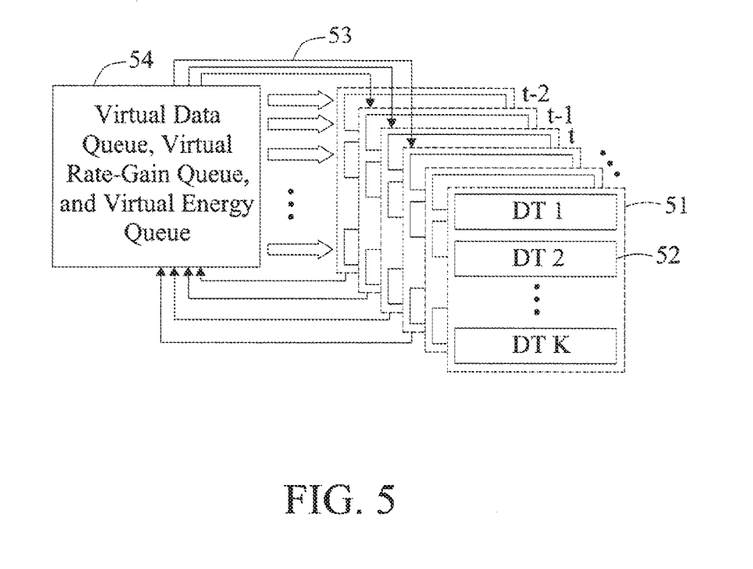
FIG. 5 is a schematic diagram illustrating briefly how the transmission devices in the cooperative communication system and method of the present disclosure calculate precoding matrices in the first and second phases.

FIG. 5 shows outline architecture of the above formulae. From FIG. 5, it can be seen that the long-term sum utility and the various constraints can be deconstructed into a simplified design with a single communication period and a single transmission device calculation by constructing virtual queues. In FIG. 5, each dashed box 51 is a communication period t, and each solid box 52 in the dashed box 51 is a transmission device DT. Arrows 53 indicate that the current calculation is based on a previous calculation result, that is, current queue status needs to use the statuses of a virtual data queue, a virtual rate-gain queue and a virtual energy queue 54 of an immediately preceding period.

Figure 6A:
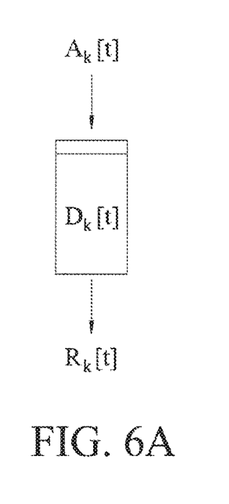
FIGS. 6A, 6B and 6C are schematic diagrams illustrating a virtual data queue, a virtual rate-gain queue and a virtual energy queue employed by the cooperative communication system and method of the present disclosure.
Figure 6B:
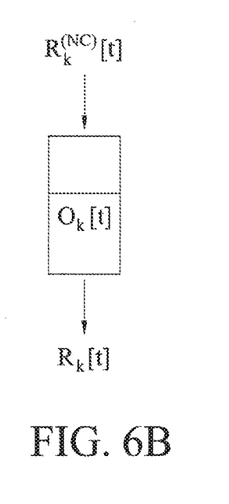
Figure 6C:
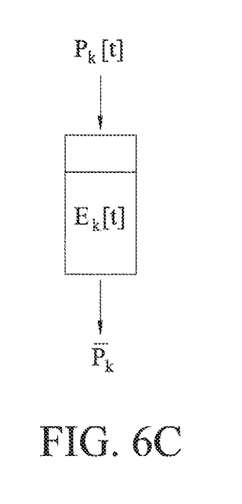

Referring to FIGS. 6A, 6B and 6C, the virtual data, rate-gain, and energy queues are defined as a data queue $D_k[t]$, a rate-gain queue $O_k[t]$ and an energy queue $E_k[t]$, respectively. As shown in FIG. 6A, the input of the data queue is a virtual arrival process $A_k[t]$, and the output is the achievable rate $R_k[t]$, and the virtual data queue of a communication period t+1 can be represented by the following equation:

$$D[t+1] = (D[t] - R[t])^+ + A[t]$$

As shown in FIG. 6B, the input of the rate-gain queue is the achievable rate without cooperation $R_k^{(NC)}[t]$, and the output is the achievable rate $R_k[t]$, and the rate-gain queue of the communication period t+1 can be represented by the following equation:

$$O[t+1] = (O[t] - R[t])^+ + R^{(NC)}[t]$$

As shown in FIG. 6C, the input of the energy queue is a power consumption $P_k[t]$, and the output is the long-term average power constraint $\overline{P}_k$, and the energy queue of the communication period t+1 can be represented by the following equation:

$$E[t+1]=(E[t]-\overline{P})^{+}+P[t]$$

Figure 7:
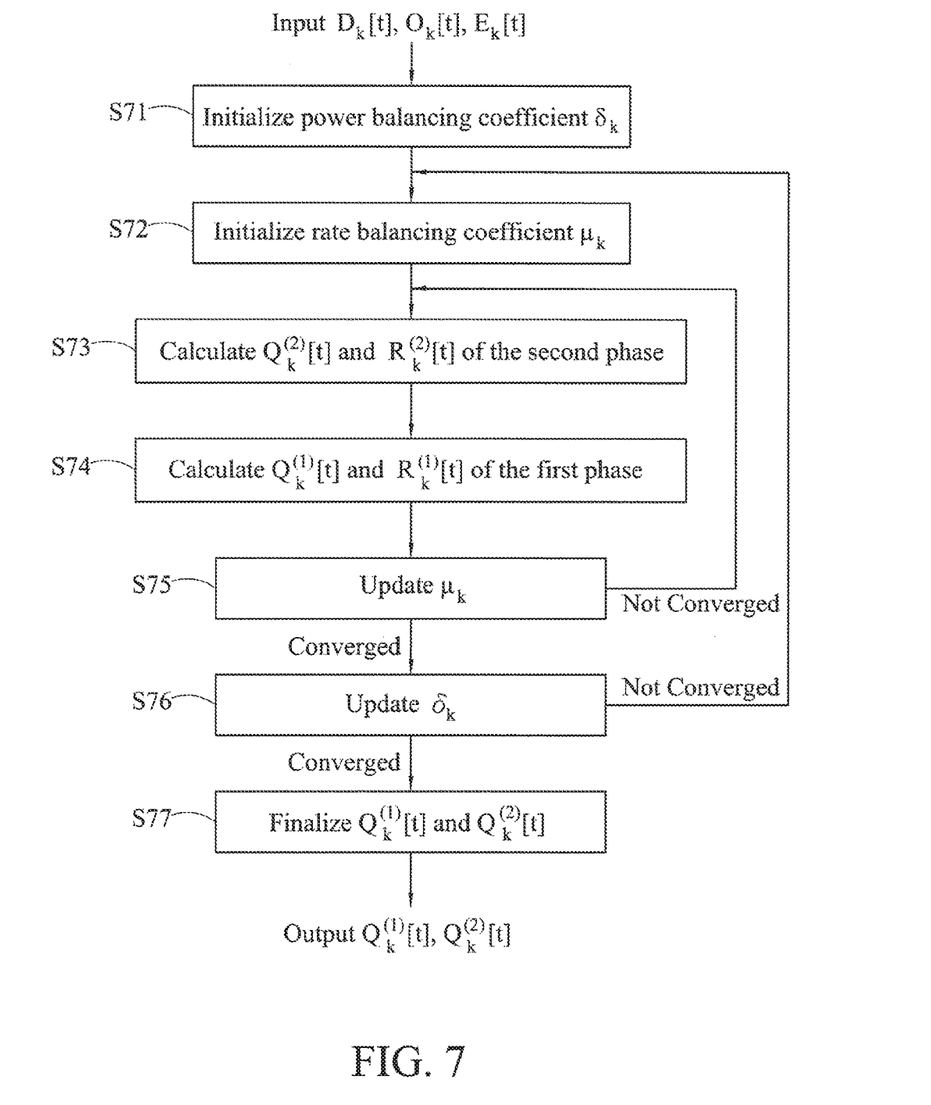
FIG. 7 is a flowchart illustrating the process for calculating the precoding matrices in the first and second phases in the cooperative communication system and method of the present disclosure.

Detailed calculations of these are described with respect to FIG. 7. First, a virtual data queue $D_k[t]$, a virtual rate-gain queue $O_k[t]$ and a virtual energy queue $E_k[t]$ are inputted. It should be noted that each communication period t will have its current queue statuses $D_k[t]$, $O_k[t]$ and $E_k[t]$. Next, proceed to step S71.

In step S71, based on the current queue statues $D_k[t]$, $O_k[t]$ and $E_k[t]$, a power balancing coefficient $\delta_k$ is initialized. The power balancing coefficient $\delta_k$ can be used for adjusting the transmission power and the interference to the base station. Next, proceed to step S72.

In step S72, based on the current queue statues $D_k[t]$, $O_k[t]$ and $E_k[t]$, a rate balancing coefficient $\mu_k$ is initialized. The rate balancing coefficient $\mu_k$ can be used for adjusting the proportions of the transmission rates of the two phases. Next, proceed to step S73.

In step S73, the rate and the precoding matrix for the second phase are calculated, that is, the achievable rate at the receiving device DR k $R_k^{(2)}[t]$ in the second phase and the covariance matrix $Q_k^{(2)}[t]$ for the joint precoding matrix $W_k^{(2)}[t]$ are computed. Next, proceed to step S74.

In step S74, the rate and the precoding matrix for the first phase are calculated, that is, the achievable multicast rate for the transmission device DT k $R_k^{(1)}[t]$ in the first phase and the covariance matrix $Q_k^{(1)}[t]$ for the multicasting precoding matrix $W_k^{(1)}[t]$ are computed. Next, proceed to step S75.

In step S75, the rate balancing coefficient $\mu_k$ is updated. If the rate balancing coefficient $\mu_k$ converges, then proceed to step S76; else return to step S73.

In step S76, the power balancing coefficient $\delta_k$ is updated. If the power balancing coefficient $\delta_k$ converges, then proceed to step S77; else return to step S72.

In step S77, the covariance matrix $Q_k^{(1)}[t]$ for the multicasting precoding matrix $W_k^{(1)}[t]$ of the first phase and the covariance matrix $Q_k^{(2)}[t]$ for the joint precoding matrix $W_k^{(2)}[t]$ of the second phase are completed. Finally, the covariance matrices $Q_k^{(1)}[t]$ and $Q_k^{(2)}[t]$ are outputted.

In the above process, given the power balancing coefficient $\delta_k$ and the rate balancing coefficient $\mu_k$, the closed-form solution of precoding matrix can be found. With fixed the power balancing coefficient $\delta_k$, the rate balancing coefficient $\mu_k$ can be found by bisection algorithm to balance the rates of the two phases. As the rate balancing coefficient $\mu_k$ converges, the power balancing coefficient $\delta_k$ can be updated by the bisection algorithm so as to balance the interference to the base station.

An exemplary method for calculating the precoding matrices of the present disclosure has already been explained above with respect to the drawings. Now a cooperative communication method for multiple transmission devices and multiple receiving devices in accordance with the present disclosure will now be illustrated with respect to FIG. 8. First, the present disclosure divides a communication period into a first phase A and a second phase B. The first phase A is a data-sharing transmission phase and the second phase B is a cooperative joint transmission. In the first phase, the transmission devices take turns in transmitting their own data to other all transmission devices, and the transmission of each transmission device in the first phase each takes up a $\eta_1$ proportion of the communication period; in the second phase, the transmission devices jointly transmit their data all to corresponding receiving devices, and the entire second phase takes up a $\eta_2$ proportion of the communication period.

Figure 8:
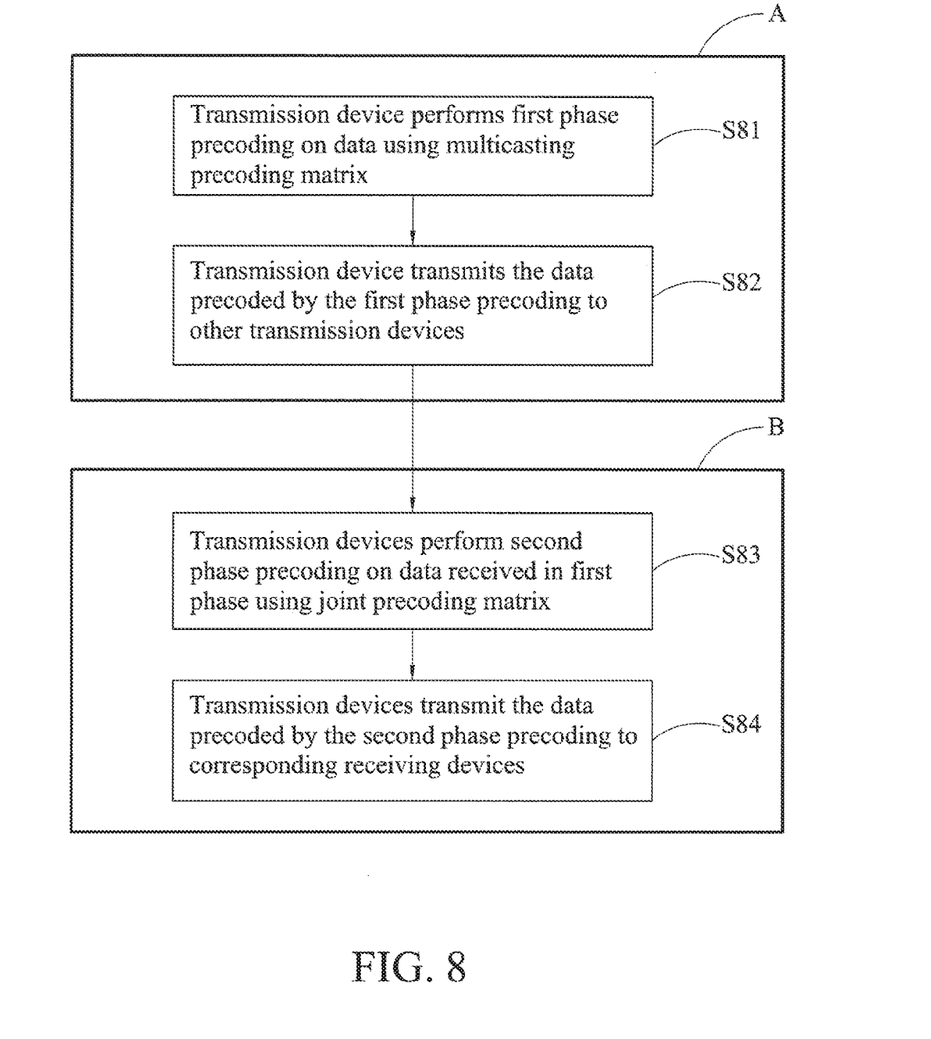
FIG. 8 is a flowchart illustrating the cooperative communication method of the present disclosure.

In the first phase A, at least one of the transmission devices transmits data to all other transmission devices using a multicasting precoding matrix, that is, one transmission device performs steps S81 and 82, thereafter another transmission device performs steps S81 and 82, and so on until all of the transmission devices have transmitted their own data to the other transmission devices. In step S81, a transmission device performs a first phase precoding on data using a multicasting precoding matrix. Then, proceed to step S82. In step S82, the transmission device transmits the data precoded by the first phase precoding to all other transmission devices.

In the second phase B, the transmission devices jointly transmit data received in the first phase using a joint precoding matrix to the receiving devices corresponding to the transmission devices. That is, in the second phase, each transmission device has its own data, as well as data from other transmission devices in the first phase. In addition, all transmission devices simultaneously perform step S83 and simultaneously perform step S84, unlike in the first phase in which they take turns in transmitting. In step S83, the transmission devices perform a second phase precoding on data received in the first phase using the joint precoding matrix. Then, proceed to step S84. In step S84, the transmission devices transmit the data precoded by the second phase precoding to the corresponding plurality of receiving devices.

Accordingly, the transmission devices of the present disclosure perform data-sharing transmission in the first phase and joint transmission in the second phase to transmit data to the receiving devices corresponding to the transmission devices, and calculate the multicast precoding matrix using for the first phase and the joint precoding matrix using for the second phase based on the transmission rates and power of two phases, thereby reducing transmission interference between the transmission devices and their corresponding receiving devices, while increasing the transmission rates and the number of D2Ds performing simultaneous transmission that can be accommodated by the system, and improving space spectrum utilization.

It should be noted that the multicasting precoding matrix used in the first phase and the joint precoding matrix used in the second phase are obtained based on the estimated transmission rates and the estimated power of the first and second phases, as well as long-term sum utility maximization, the long-term power constraint, the cooperative rate-gain constraint, and interference constraint (interference to the base station), while taking into account the balance of the rates and power of the two phases, as well as the virtual data queue, the virtual rate-gain queue and the virtual energy queue, which are constructed in such a way that the queue statues of the current period is based on the queue statues of the immediately preceding period.

In conclusion, the cooperative communication method and system applicable to multiple transmission devices and multiple receiving devices of the present disclosure is capable of improving the quality of the receiving signals of the receiving devices and reducing the interference between the transmission devices.

The above embodiments are only used to illustrate the principles of the present disclosure, and should not be construed as to limit the present disclosure in any way. The above embodiments can be modified by those with ordinary skill in the art without departing from the scope of the present disclosure as defined in the following appended claims.

What is claimed is:

1. A method for cooperative communication, comprising:
performing in a first phase, by at least one of a plurality of transmission devices, a first phase precoding on data using a multicasting precoding matrix;
transmitting in the first phase, by the at least one of the plurality of transmission devices, the data precoded by the first phase precoding to transmission devices other than the at least one of the plurality of transmission devices;
performing in a second phase, by the plurality of transmission devices, a second phase precoding on data received in the first phase using a joint precoding matrix; and
transmitting in the second phase, by the plurality of transmission devices, the data precoded by the second phase precoding to a plurality of receiving devices corresponding to the plurality of transmission devices,
wherein the transmission devices use respective multicasting precoding matrixes and respective joint precoding matrixes,
wherein the multicasting precoding matrix and the joint precoding matrix are calculated based on an estimated transmission rate or an estimated transmission power of the plurality of transmission devices in the first phase and the second phase.

2. The method of claim 1, wherein the multicasting precoding matrix and the joint precoding matrix are calculated based on maximizing a long-term sum utility of the plurality of transmission devices and the plurality of the receiving devices.

3. The method of claim 2, wherein the long-term sum utility is calculated based on sum of an average transmission rate of the plurality of the transmission devices and the plurality of the receiving devices or based on proportional fairness of the plurality of the transmission devices and the plurality of the receiving devices.

4. The method of claim 1, wherein the multicasting precoding matrix and the joint precoding matrix are further calculated based on at least one of a long-term power constraint, a cooperative rate-gain constraint and an interference constraint.

5. The method of claim 4, wherein the long-term power constraint is based on a condition that a long-term average power consumption of the transmission devices is constrained to be less than or equal to a power consumption threshold.

6. The method of claim 4, wherein the cooperative rate-gain constraint is based on a condition that a long-term average transmission rate is constrained to be greater than or equal to a long-term average transmission rate without cooperative communication.

7. The method of claim 4, wherein the interference constraint is based on a condition that an interference on a receiving signal at a base station is constrained to be less than or equal to an interference threshold.

8. The method of claim 1, wherein the multicasting precoding matrix and the joint precoding matrix are further calculated based on at least one of a virtual data queue, a virtual rate-gain queue and a virtual energy queue of each of the plurality of transmission devices.

9. The method of claim 1, further comprising allocating power consumption in the first phase and the second phase in balance.

10. The method of claim 1, further comprising allocating transmission rate in the first phase and the second phase in balance.

11. A system for cooperative communication, comprising:
a plurality of transmission devices, each comprising a signal transceiver and a processor; and
a plurality of receiving devices corresponding to the plurality of transmission devices, and each comprising a signal transceiver and a processor,
wherein in a first phase, the processor of at least one of the plurality of transmission devices is configured to perform a first phase precoding on data using a multicasting precoding matrix, and the signal transceiver of the at least one of the plurality of transmission devices is configured to transmit the data precoded by the first phase precoding to transmission devices other than the at least one of the plurality of transmission devices; and
in a second phase, the processors of the plurality of transmission devices are configured to perform a second phase precoding on data received in the first phase using a joint precoding matrix, and the signal transceivers of the plurality of transmission devices are configured to transmit the data precoded by the second phase precoding to the plurality of receiving devices corresponding to the plurality of transmission devices, and wherein the transmission devices use respective multicasting precoding matrixes and respective joint precoding matrixes, and wherein the processors of the plurality of transmission devices are configured to calculate the multicasting precoding matrix and the joint precoding matrix based on an estimated transmission rate or an estimated transmission power of the plurality of transmission devices in the first phase and the second phase.

12. The system of claim 11, wherein the processors of the plurality of transmission devices are configured to calculate the multicasting precoding matrix and the joint precoding matrix based on maximizing a long-term sum utility of the plurality of transmission devices and the plurality of the receiving devices.

13. The system of claim 12, wherein the processors of the plurality of transmission devices are configured to calculate the long-term sum utility based on sum of an average transmission rate of the plurality of the transmission devices and the plurality of the receiving devices or based on proportional fairness of the plurality of the transmission devices and the plurality of the receiving devices.

14. The system of claim 11, wherein the processors of the plurality of transmission devices are configured to calculate the multicasting precoding matrix and the joint precoding matrix based on at least one of a long-term power constraint, a cooperative rate-gain constraint and an interference constraint.

15. The system of claim 14, wherein the processors of the plurality of transmission devices are configured to constrain long-term power based on a condition that a long-term average power consumption of the transmission devices is less than or equal to a power consumption threshold.

16. The system of claim 14, wherein the processors of the plurality of transmission devices are configured to constrain the cooperative rate-gain based on a condition that a long-term average transmission rate is greater than or equal to a long-term average transmission rate without cooperative communication.

17. The system of claim 14, wherein the processors of the plurality of transmission devices are configured to constrain the interference based on a condition that an interference on a receiving signal at a base station is less than or equal to an interference threshold.

18. The system of claim 11, wherein the processors of the plurality of transmission devices are configured to calculate the multicasting precoding matrix and the joint precoding matrix based on at least one of a virtual data queue, a virtual rate-gain queue and a virtual energy queue of each of the plurality of transmission devices.

19. The system of claim 11, wherein the processors of the plurality of transmission devices are configured to allocate the power consumption of the first phase and the second phase in balance.

20. The system of claim 11, wherein the processors of the plurality of transmission devices are configured to allocate the transmission rate of the first phase and the second phase in balance.

\* \* \* \* \*